United States Patent [19]

Imoto et al.

[11] Patent Number: 4,629,039
[45] Date of Patent: Dec. 16, 1986

[54] VEHICLE BRAKING CONTROL APPARATUS

[75] Inventors: Yuzo Imoto, Kariya; Yoshiyuki Hattori, Toyoake; Toshihiro Takei, Okazaki; Taro Tanaka, Nagoya, all of Japan

[73] Assignees: Nippondenso Co., Ltd, Kariya; Nippon Soken, Inc., Nishio, both of Japan

[21] Appl. No.: 816,051

[22] Filed: Jan. 3, 1986

[30] Foreign Application Priority Data

Jan. 17, 1985 [JP] Japan .................. 60-5041
Jan. 21, 1985 [JP] Japan .................. 60-7456
Jan. 21, 1985 [JP] Japan .................. 60-7457

[51] Int. Cl.$^4$ .................. B60T 8/02; F16D 55/08
[52] U.S. Cl. .................. 188/72.1; 188/72.3; 188/72.4; 188/106 P; 188/158; 303/68; 303/113; 303/119; 310/328
[58] Field of Search .............. 310/328; 188/72.1, 72.3, 188/216, 72.4–72.6, 71.1, 106 P, 106 R, 158–165, 181; 303/113–119, 92, 91, 100, 93, DIG. 3, DIG. 4, 68, 69; 60/545

[56] References Cited

U.S. PATENT DOCUMENTS

| | | | |
|---|---|---|---|
| 3,313,381 | 4/1967 | Hartling et al. | 188/72.1 X |
| 4,130,188 | 12/1978 | Askew | 188/72.1 X |
| 4,228,874 | 10/1980 | Brinkmann et al. | 188/72.1 |
| 4,299,312 | 11/1981 | Bengtsson et al. | 188/165 |
| 4,433,757 | 2/1984 | Warwick et al. | 188/72.4 X |
| 4,435,021 | 3/1984 | Hoenick | 188/72.4 X |
| 4,553,059 | 11/1985 | Abe et al. | 310/328 |
| 4,570,095 | 2/1986 | Uchikawa | 310/328 |
| 4,570,098 | 2/1986 | Tomita et al. | 310/328 X |

FOREIGN PATENT DOCUMENTS 59-199352 11/1984 Japan .

OTHER PUBLICATIONS

Four Years of Experience with 4-Wheel Antiskid Brake Systems (ABS), Heinz Leiber et al, pp. 1–8.

*Primary Examiner*—Douglas C. Butler
*Attorney, Agent, or Firm*—Cushman, Darby & Cushman

[57] ABSTRACT

A wheel cylinder is formed in the brake caliper for each wheel of a vehicle and brake fluid is supplied from a master cylinder to this wheel cylinder by way of a fluid passage. A brake piston is provided inside the wheel cylinder and includes a piezoelectric piston device inside. By the application of voltage, this piezoelectric piston device expands and contracts the brake piston. A control valve is provided in the fluid passage to open and close it to selectively partition off the master cylinder. When the control valve has closed the passage, a voltage is applied to the piezoelectric piston device to expand it and control the pressure acting on the brake piston in the wheel cylinder to vary the braking force.

19 Claims, 7 Drawing Figures

VEHICLE BRAKING CONTROL APPARATUS

BACKGROUND OF THE INVENTION

This invention relates generally to a braking control apparatus for a vehicle, such as an automobile, in which the braking action is based on a command resulting from the operation of a brake pedal, and more particularly, to a braking control apparatus which avoids the problem of slippage occurring due to the wheels locking, to thereby provide stable braking control.

The braking device provided for each wheel is operated by the pressure of the brake fluid. Brake fluid under pressure is supplied to each wheel cylinder from the master cylinder by the operation of the brake pedal. This brake fluid drives the brake piston provided in the wheel cylinder for applying a braking force against the rotary brake disc which is provided coaxial with the wheel of the automobile.

A piston, which is operated by the brake pedal to generate brake fluid pressure, is provided inside the master cylinder which is positioned near the driver's seat. Between the master cylinder and each wheel is located a brake pipe for the transmission of the brake fluid. An increase in the pressure results in the brake pipe expanding and changes in the compression of the fluid in the pipe, which in turn is the source of delays in pressure transmission.

When, upon operation of the brake pedal, the wheels begin to slip in relation to the ground and then lock, it is necessary that the braking force be immediately reduced to unlock the wheels and prevent slippage. What is desired is an antiskid control apparatus which detects the locking of the wheels and automatically controls the braking force. Various means have been considered for this kind of antiskid control apparatus.

For example, when wheel lock is detected, an electromagnetic valve, which is provided in the fluid passage between the master cylinder and the wheel cylinder, reduces the pressure of the fluid supplied to the wheel cylinder. In this case, however, any delay in transmission will result in a delay in response to the antilock operation, and any structure that improves the responsiveness is difficult to build.

Another example is a device which uses traction control such that the rotary force of the wheels is delivered efficiently to the ground. When slippage resulting from wheel spin is detected, the electromagnetic valve is operated to control the supply of fluid pressure to the wheel cylinder where slippage has occurred. In this case, as well, response cannot be controlled because of the transmission delay in the braking system.

SUMMARY OF THE INVENTION

The object of this invention is to provide an automobile braking control apparatus, which can perform antiskid control and traction control, etc. so that the braking force of the wheels can be minutely controlled.

Another object of the invention is to provide an automobile braking control apparatus which can control the fluid pressure generated in braking device of each wheel and in which the pipes for transmitting brake fluid can be eliminated.

Another object of the invention is to provide an automobile braking control apparatus in which the braking force generated by the braking mechanism at each wheel can be independently and electronically controlled to effectively control the stable running of the automobile.

Another object of the invention is to provide an automobile braking control apparatus in which the response and reliability is improved.

In the automobile braking control apparatus of this invention a wheel cylinder is provided for each wheel of an automobile and a piezoelectric piston device in which the contraction and expansion of the piezoelectric elements is controlled by the voltage of a signal is provided for varying the volume of the wheel cylinder. The piezoelectric piston device is provided with a displacement amplification mechanism which amplifies the contraction and expansion of the piezoelectric elements in varying the volume of the wheel cylinder.

With this kind of apparatus the amount of expansion and contraction of the piezoelectric elements in response to the control voltage that is supplied is very small but large changes in wheel cylinder volume can be obtained with the displacement amplification mechanism so that the pressure acting on the brake piston in the wheel cylinder can be effectively controlled to provide effective electronic control of the braking. As control of the brake piston fluid pressure is electronic, the control is extremely responsive for very effective antiskid control, etc.

DETAILED DESCRIPTION OF THE PREFERRED EMBODIMENTS

Figure 1:
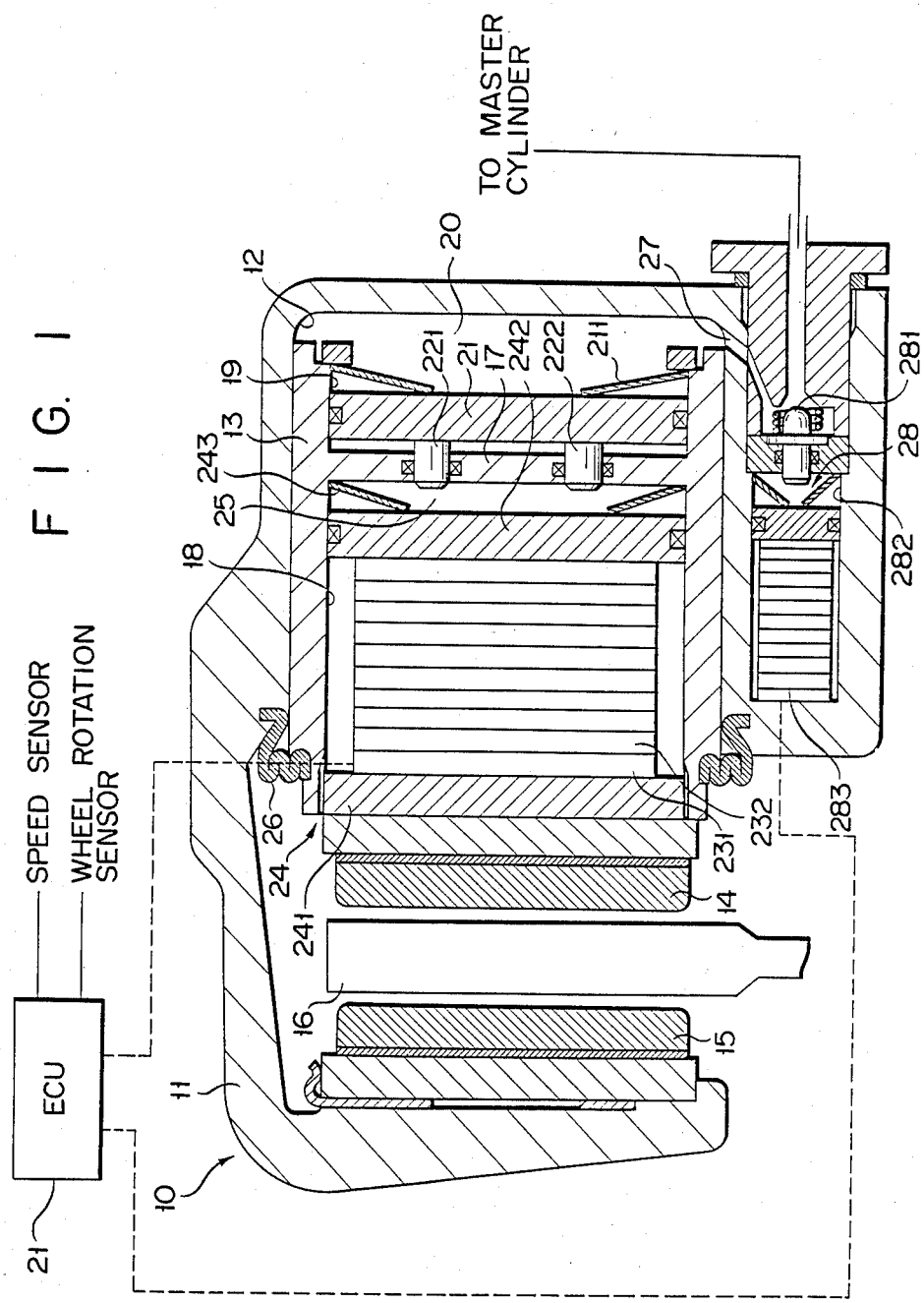
FIG. 1 shows a cross section of part of the braking control apparatus for each wheel according to the first embodiment of this invention.

FIG. 1 shows a braking apparatus 10 for one wheel of an automobile, the braking apparatuses for the other wheels being the same.

Braking apparatus 10 is made of metal and is formed on the inside of brake caliper 11. Wheel cylinder 12, which is formed in brake caliper 11, has a brake piston 13 to which is attached brake pad 14 and which slides in the axial direction in the cylinder. Brake pad 14 and brake piston 13 are moved together to apply pressure to brake disc 16 which is positioned between brake pad 14 and brake pad 15 which is attached to brake caliper 11. Brake disc 16 rotates together with the wheel so the vehicle is braked.

Brake piston 16 is cylindrical in shape and is partitioned on the inside by wall 17 to form first and second control cylinders 18 and 19 which are also coaxial with wheel cylinder 17. Second control cylinder 19 forms hydraulic pressure chamber 20.

Control piston 21, which is a displacement member and moves in the axial direction, is provided inside second control cylinder 19. A plurality of small pistons 221, 222, . . . are provided projecting from control piston 21 to face wall 17 and are inserted into cylinder holes formed in wall 17 so that they project into first control cylinder 18. In this embodiment there are a plurality of these small pistons but there need be only one. Springs 211 act on control piston 21 to push small pistons 221, 222 toward first control cylinder 18.

Piezoelectric piston device 24 includes a piezoelectric device 23, which comprises a plurality of laminated thin-plate piezoelectric elements 231, 232, . . . , and is provided inside first control cylinder 18. First and second plates 241 and 242 are sandwiched and held between piezoelectric elements 231, 232, . . . and first plate 241 is screwed into brake piston 13 at the first control cylinder end. Second plate 242 faces wall 17 and a hydraulic chamber 25 is formed in between. Springs 243 are located in hydraulic chamber 25 and urge second plate 242 together with piezoelectric elements 231, 232, . . . toward first plate 241.

The plurality of piezoelectric elements 231, 232, . . . that comprise piezoelectric device 23 are laminated with electrode plates (not shown) in between. These electrode plates are connected in parallel with piezoelectric elements 232, 232, . . . . When a high voltage is applied to this group of piezoelectric elements they expand and second plate 242 moves toward wall 17. More specifically what happens is that piezoelectric piston device 24 expands decreasing the volume of hydraulic chamber 25 so the volume of hydraulic chamber 25 is varied by the application of voltage to piezoelectric device 23.

Hydraulic chamber 25 is sealed and filled with brake fluid so small pistons 221, 222 are driven by the amount of the changes in the volume of hydraulic chamber 25 caused by the contraction and expansion of piezoelectric piston device 24. The surface area of the small pistons 221, 222 is less than that of the working surface of piezoelectric piston device 24 which is the surface of second plate 242 facing hydraulic chamber 25 so the displacement volume of piezoelectric piston device 24, i.e., the amount of movement of second plate 242, is amplified and transmitted to small pistons 221, 222, . . . , which drive control piston 21. The mechanism for these small pistons acts as a displacement amplifying mechanism for amplifying and transmitting the movement of piezoelectric piston device 24 to control piston 21, which is the displacement member.

Brake piston 13 is connected to brake caliper 11 at the opening of wheel cylinder 13 by coupling member 26, which is made of a flexible sheet, to thereby provide stable movement of brake piston 13 inside wheel cylinder 12.

Brake fluid is supplied from fluid passage 27, which is formed in brake caliper 11, to hydraulic chamber 20 formed in wheel cylinder 12. Fluid passage 27 is connected to the master cylinder (not shown).

Control valve 28 is provided in fluid passage 27 and the passage is opened and closed by valve plug 281. Valve plug 281 is driven by the fluid pressure in cylinder 282 in which a piezoelectric piston 283 comprising a plurality of laminated thin-plate piezoelectric elements is provided. Then when a high voltage is supplied to these piezoelectric elements and they expand, the pressure in hydraulic chamber 282 increases and valve plug 281 is driven to close passage 27.

The piezoelectric piston device 24 and control valve 28 of this kind of braking control apparatus 10 are controlled by control unit 29, which may be a microcomputer, for example. This microcomputer may also be used for controlling the engine of the automobile by receiving detection signals from surface speed and wheel speed sensors, etc. Control unit 29 controls the voltage that is supplied to the piezoelectric elements that comprise piezoelectric piston 283.

Braking control apparatus 10 described above is provided for each wheel. It is, however, possible to provide the apparatus for only the rear wheels 30, 31 and provide the front wheels 32, 33 with a conventional braking apparatus. In such a case, the rear wheels are the driving wheels and control valve 28 is provided in the fluid transmission circuit for supplying brake fluid to the particular wheel cylinders 12.

Figure 2:
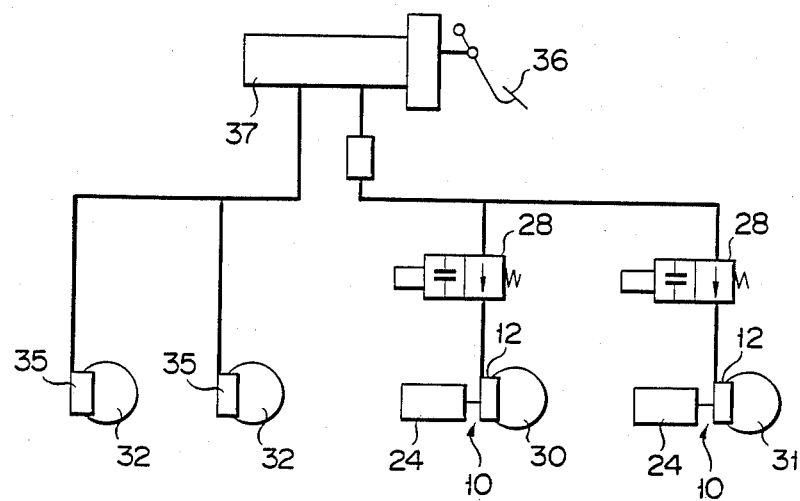
FIG. 2 shows the braking control system of the above apparatus as applied to a vehicle.

As shown in FIG. 2, when brake pedal 36 is depressed, the pressure of the brake fluid in master cylinder 37 rises and is transmitted to wheel cylinder 12 to apply a braking force on wheels 30–33 corresponding to the force applied to brake pedal 36. In the normal state, control valve 28 is open and the brake fluid is supplied directly to wheel cylinder 12 to drive brake piston 13.

When brake pedal 36 is depressed strongly while the automobile is running, the wheels will slip in relation to the ground and lock. The lock-up of the wheels constitutes an abrupt change in the rotary speed of the wheel which is detected by control unit 29. The relationship between the rotary speed of the wheel and the surface speed may also be used by control unit 29 to detect lock-up. When wheel 31 locks up, for example, control unit 29 switches the voltage supplied to piezoelectric device 23 of braking control apparatus 10 to high level. Piezoelectric piston device 24 expands and the volume inside hydraulic chamber 20 of wheel cylinder 12 is decreased. Since the pressure in hydraulic chamber 20 is determined by master cylinder 37, there is no change. Then control valve 28 closes off fluid passage 27.

By closing control valve 28 the volume of hydraulic chamber 20 of wheel cylinder 12 is kept constant and, in this state, the voltage supplied to piezoelectric device 23 of piezoelectric piston device 24 is switched to low level thereby contracting it. Brake piston 13 then pulls pad 14 from brake disc 16 and the braking force to the wheel that is locked is reduced. In this way control of the braking can be performed based on a suitable slip ratio.

Since the pressure in wheel cylinder 12 is controlled by a device inside caliper 11, it is possible to provide a very responsive antiskid control system than is also very compact. Also, since the piezoelectric device is controlled electronically by commands from control unit 29, a suitable slip rate can be set for each wheel for the most effective braking control. In this case, even if the changes to the voltage supplied to the piezoelectric elements are small and the amount of expansion and contraction is small, the amount of contraction and expansion of piezoelectric piston device 24 is large due to the amplifying action of small pistons 221, 222, . . . . Also, since the volume of hydraulic chamber 20 of wheel cylinder 12 is extremely small, control of the pressure is extremely responsive.

The above braking control apparatus 10 is not limited to this kind of antiskid control but also can perform traction control for preventing slippage that occurs due to spinning of the wheels during acceleration. During acceleration the brake is not operated and the pressure in wheel cylinder 12 is low. When it is detected that the wheels are spinning, control valve 28 is closed while piezoelectric piston device 24 of the spinning wheel is in a contracted state. A high voltage is then applied to piezoelectric device 23 of piezoelectric piston device 24 to expand piston device 24 and raise the pressure in wheel cylinder 12. The braking force on the wheel now stops the spinning so that smooth acceleration with minimum slippage between the wheels and the ground is possible.

In the above embodiment fluid pressure was transmitted to the braking device from the master cylinder. There is however the danger that the hydraulic circuit will be damaged or that the transmission of pressure from the master cylinder to the wheel cylinder will be delayed and the responsiveness and reliability of the braking system degraded. With the braking control apparatus described above it is possible to eliminate the hydraulic system for delivering brake fluid pressure from the master cylinder.

Figure 3:
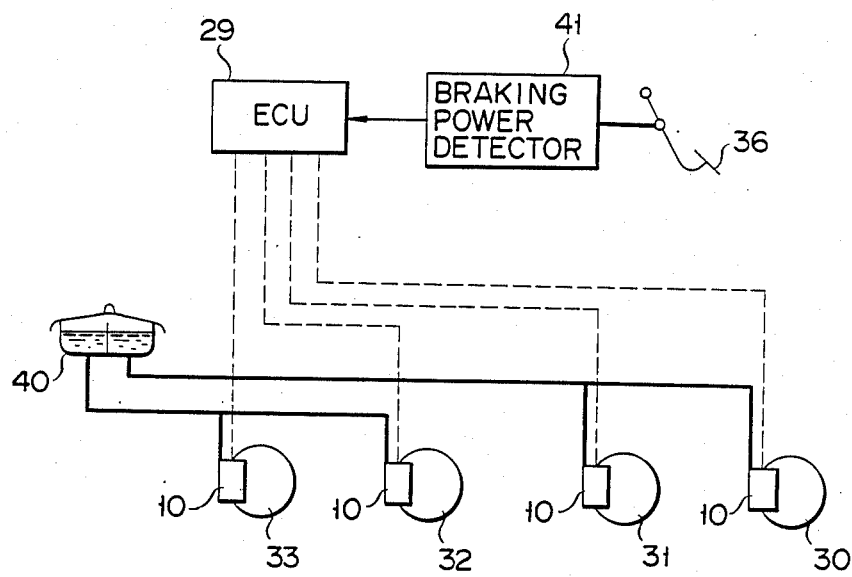
FIG. 3 shows another example of a braking control system.

FIG. 3 shows another example of a braking system using control apparatus 10. Braking control apparatuses 10 are provided for each wheel 30–33. Brake fluid is supplied from reserve tank 40 to control valve 28 of each apparatus. Each apparatus is controlled by commands from control unit 29. Detection signals are supplied brake operation detector 41 to control unit 29.

Brake operation detector 41 is constructed of piezoelectric elements which produce a voltage signal when brake pedal 36 is operated. This signal is supplied to control unit 29. It is possible that a potentiometer be used to detect the stroke of brake pedal 36.

When control unit 29 receives such a detection signal, the voltage to piezoelectric device 23 is switched to low level which then contracts and the pertinent control valve 28 closes passage 27. In this state, the pressure in hydraulic chamber 20 of wheel cylinder 12 increases with the expansion of piezoelectric piston device 24 and by controlling the voltage to piezoelectric device 23 it is possible to vary the braking force. The voltage supplied to piezoelectric device 23 is controlled based on the detection signal from brake operation detector 41 so that the braking force on the wheels corresponds to the force applied to brake pedal 36.

The voltage supplied to piezoelectric device 23 may be controlled by an analog value corresponding to the force applied to brake pedal 36, however, it is also possible to form a pulse signal whose duty cycle is set corresponding to the detection signal from detector 41 by control unit 29. This pulse signal is then sent to piezoelectric device 23. As the expansion of piezoelectric piston 24 is controlled by the duty cycle of the pulse signal supplied from control unit 29, it is possible to digitalize the control of the braking force. In this case, the pressure of the brake pad against the brake disc is detected by piezoelectric elements, for example, and the detection signal is supplied to control unit 29 to provide a feedback control in which the braking is controlled in response to the detection signal. This provides a reliable braking force which corresponds to the force applied to brake pedal 36 and is uniform for all wheels.

The antiskid control and traction control are both performed by contracting piezoelectric piston device 24 when the fluid pressure in wheel cylinder 12 is high.

With this kind of braking control system in which operation of brake pedal 36 is electrically detected and braking commands are issued from control unit 29, backup structure can be provided in case any part of the command means is damaged.

Figure 4:
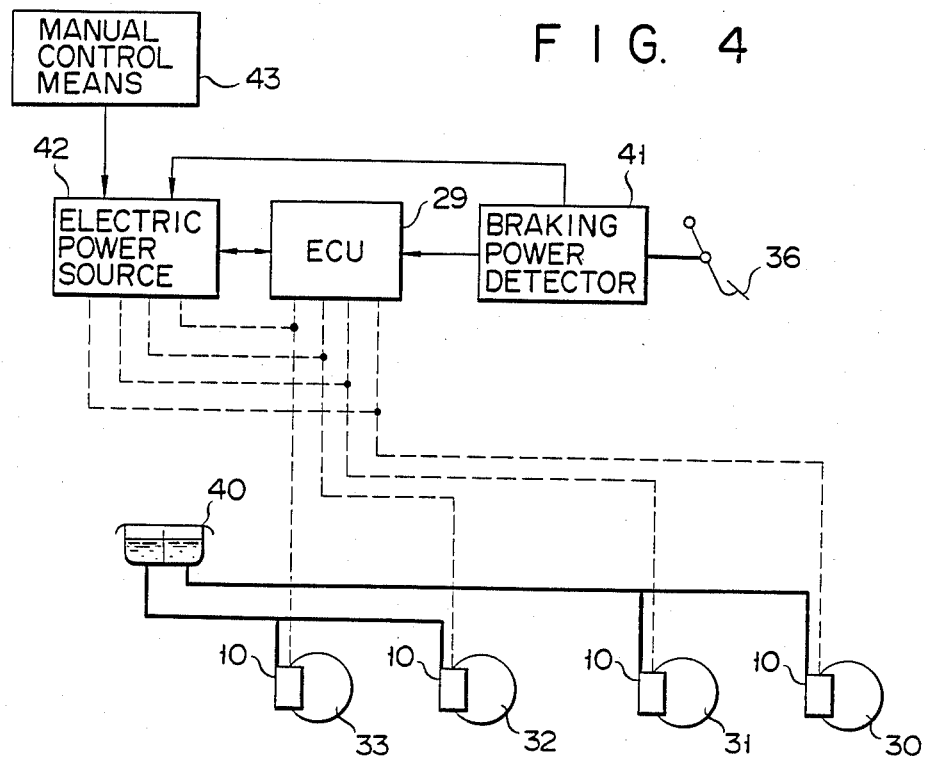
FIGS. 4 and 5 show still another example of a braking control.

FIG. 4 shows an example of such back-up structure which includes an emergency power source 42. This power source is employed when, for example, it is detected that power has been cut off to control unit 29 so that braking is automatically performed. When the voltage generated by emergency power source 41 is controlled directly by the detection signal from the braking operation detector 41, it is possible to provide a braking force corresponding to the force applied to brake pedal 36.

If manual control apparatus 43 is provided to vary the voltage generated from power source 42, it becomes possible to control the braking force using manual control apparatus 43.

Figure 5:
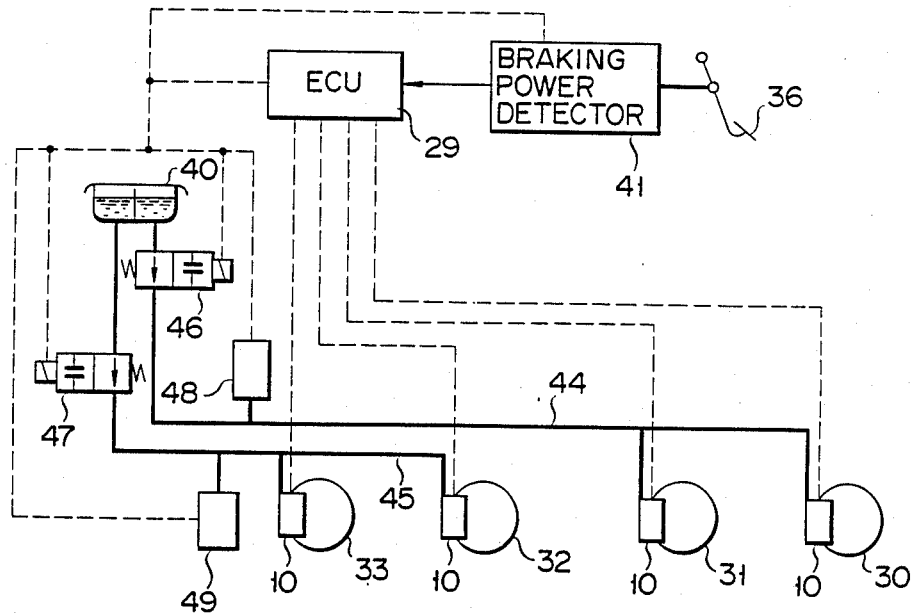

FIG. 5 shows another example of a control system. Control valves 46 and 47 are provided in the pipes 44 and 45 between reserve tank 40 and the front wheels 30, 31 and the rear wheels 32, 33. Control valves 46 and 47 normally are open and, when a malfunction occurs in all or part of the front or rear wheel system, valve 46 or 47 closes to shut off the system in which the malfunction has occurred.

Volume control devices 48 and 49 are provided in pipes 46 and 47 for emergency use. These devices each comprise a PS pump and an accumulator, etc. and have the function of supplying brake fluid to pipes 46 and 47. When a malfunction is detected in control unit 29, a command is sent to both control valves 46 and 47 or to only the one for the system in which a malfunction has occurred, and the corresponding pipe is closed off. This state is the same as when control valve 28 of braking control apparatus 10 is closed so it is possible to generate a braking force using the pressure generated by emergency volume control device 48 or 49.

Figure 6:
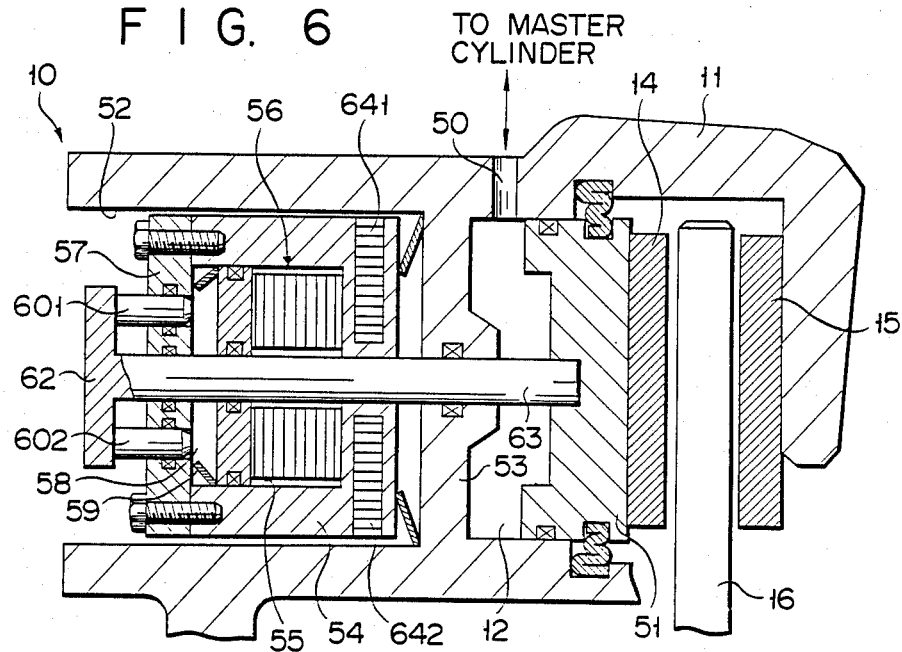
FIG. 6 is a cross section of another example of a braking control apparatus applied to each wheel.

FIG. 6 shows another example of braking control apparatus 10 in which wheel cylinder 12 is formed in brake caliper 11. Brake piston 51, which is provided in wheel cylinder 11, has brake pad 12 attached to it. Brake fluid from the master cylinder is supplied to wheel cylinder 12 via port 50. Fluid pressure in wheel cylinder 12 goes up when the brake pedal is operated and drives brake piston 51.

Guide cylinder 52 is also formed inside brake caliper 11 coaxial with wheel cylinder 12. Guide cylinder 52 and wheel cylinder 12 are partitioned by wall 53. Housing 54 is provided inside guide cylinder 52 movable along the axis of cylinder 52. Housing 54 has a cylindrical shape that fits the inside surface of guide cylinder 52 and the portion facing wall 53 is sealed by a bottom plate. Control cylinder 55 is formed coaxially inside guide cylinder 52.

Piezoelectric piston device 56, which is constructed of piezoelectric elements laminated on a plurality of plates, is provided inside control cylinder 55. One surface of this laminated structure abuts against the bottom plate of housing 54. The opening of control cylinder 55 is sealed by lid plate 57 and hydraulic chamber 58 is formed between plate 57 and piezoelectric piston device 56. Spring 59 is provided between plate 57 and piezoelectric piston device 56 and urges the piezoelectric elements that comprise piston device 56 toward the bottom plate of housing 54.

A plurality of cylinder holes, into which are inserted small pistons 601, 602, . . . , are formed parallel to the axis of guide cylinder 52 in lid plate 57, which forms hydraulic chamber 58. Small pistons 601, 602, . . . , which are attached to displacement member 62, are pushed to the outside of lid plate 57 and are pulled into hydraulic chamber 58 by the changes in pressure in hydraulic chamber 58. Displacement member 62 is driven parallel to the axis of guide cylinder 52 in response to the pressure in hydraulic chamber 58.

The surface area of the working surface facing hydraulic chamber 58 is larger than the area of the working surface of small pistons 601, 602, . . . so displacement member 62 is displaced by a greater amount than is piezoelectric piston device 56. Shaft 63 is integrally attached to displacement member 62. Shaft 63 passes through plate 57, the central axis portion of piezoelectric piston device 56, the bottom plate of guide cylinder 52 and wall 53, and is coupled to brake piston 51, so that displacement member 62 together with brake piston 51 moves inside wheel cylinder 51.

Housing 54 moves inside guide cylinder 52. When fluid pressure in wheel cylinder 12 rises and brake piston 51 starts to move, housing 54 moves together with it. However, housing 54 may be fastened inside guide cylinder 52, if necessary. In this case, spring 65 pushes housing 54 away from brake disc 16 so brake piston 51 moves away from brake disc 16.

A plurality of openings are formed in housing 54 facing the inner periphery of guide cylinder 52 and at right angles to the axis of cylinder 52. Piezoelectric devices 641, 642, . . . formed of a plurality of laminated thin-plate piezoelectric elements are housed in these openings and are expanded by the application of a high voltage so that they protrude from the openings in housing 54 and abut against the inner peripheral surface of guide cylinder 52. In this state housing 54 is held against the inside of guide cylinder 52.

In normal operation when the fluid pressure in the master cylinder increases as a result of the operation of the brake pedal, the fluid is supplied to wheel cylinder 12, brake piston 51 is driven and a braking force is applied to brake disc 16. During such normal operation a high voltage is not applied to piezoelectric devices 641, 642, . . . so they are contracted and do not contact the inside surface of guide cylinder 52. In other words, housing 54 is able to move freely inside guide cylinder 52 and so moves together with brake piston 51.

In this kind of normal braking control situation, when the brake pedal is depressed hard and high brake fluid pressure is produced locking the wheels, a wheellock signal is generated based on which a high voltage is applied to piezoelectric devices 641, 642, . . . which expand and hold housing 54 against the inside of guide cylinder 52 at the position in which it was located at the time. In this state piston device 56 contracts without a high voltage being applied.

A high voltage is applied to the piezoelectric elements of piston device 56 with housing 54 being held against guide cylinder 52 and piston device 56 expands decreasing the volume of hydraulic chamber 58 inside housing 54 to push small pistons 601, 602, . . . from hydraulic chamber 58. Then displacement member 62 is moved by small pistons 601, 602, . . . and brake piston 51 pulls pad 14 away from brake disc 16. In other words, the braking force acting on brake disc 16 is reduced and the wheels are unlocked.

It is also possible to prevent wheel spin from occurring during acceleration. As the brake pedal is not operated at this time, the brake fluid pressure in wheel cylinder 12 is low and brake piston 51 is in a position where it cannot exert a braking force on disc 16. When the wheels spin in this state, piezoelectric piston device 56 of the spinning wheel is expanded. Then a high voltage is applied to piezoelectric devices 641, 642, . . . to hold housing 54 in a position facing wheel cylinder 12.

If a high voltage is then applied to piston device 56 to expand it, brake piston 51 will move toward brake disc 16 and the spinning will be stopped, resulting in the smooth acceleration of the automobile.

Figure 7:
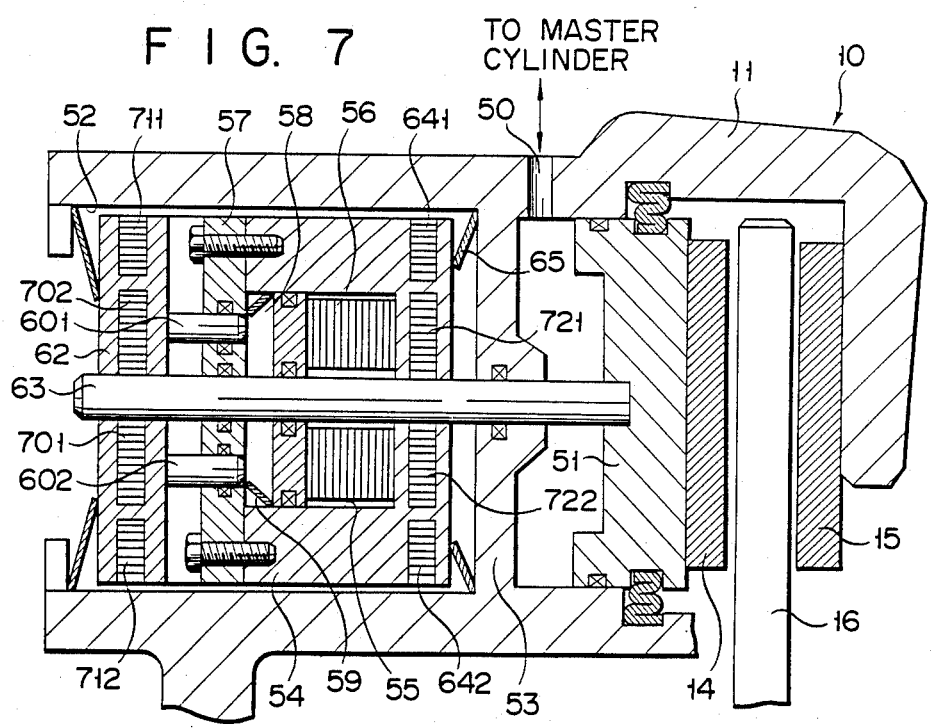
FIG. 7 is a cross section of another example of a braking control apparatus.

FIG. 7 shows a variation on the above embodiment. In the embodiment of FIG. 6, shaft 63 was integrally coupled with displacement member 62 and not with piezoelectric piston device 56. However, in this embodiment shaft 63 passes through the center of displacement member 62 in the axial direction so that they can move together. When a high voltage is applied to displacement member 62, shaft 63 is gripped as a result of piezoelectric devices 701, 702, . . . . Piezoelectric devices 711, 712, . . . are provided to force the displacement member 62 against the inner surface of guide cylinder 52 when a high voltage is applied. Displacement member 62 can therefore be selectively held in any position inside guide cylinder 52.

Housing 52, which houses piezoelectric piston device 56, is provided with piezoelectric devices 721, 722, . . . for gripping shaft 63 when a high voltage is applied so that housing 52 can be selectively coupled with shaft 63. The rest of the structure is the same as in FIG. 6 so the same reference numerals have been applied and a description is omitted.

In this embodiment, shaft 63 and displacement member 62 are coupled by applying a high voltage to piezoelectric devices 701, 702, . . . , which is the same as the embodiment of FIG. 6. In this case a high voltage is not applied to piezoelectric devices 721, 722, . . . . Separate operations are possible by releasing the coupling between displacement member 62 and shaft 63 and applying a high voltage to piezoelectric devices 721, 722, . . . , housing 54 and shaft 63 are coupled, or by applying a high voltage to piezoelectric devices 711, 712, . . . and coupling the inner surface of guide cylinder 52 and displacement member 62. Movement is controlled by piezoelectric piston device 56 with housing 54 at the displacement member 62 position being the standard position. When piezoelectric piston device 54 is expanded with housing 54 in this position, piston 51 driven to generate a braking force.

By coupling either shaft 63 and displacement member 62 or housing 54 and displacement member 62, the direction of the braking force corresponding to the expansion of piezoelectric piston device 56 is reversed, making it possible to select either an antiskid force or a traction control force with an extremely simplified control system.

What is claimed is:

1. A vehicle braking control apparatus, comprising:
   a wheel cylinder, which is formed in a brake caliper and is provided for each wheel, and to which a fluid is supplied to exert a braking force;
   a brake piston movably provided in and coaxial with said wheel cylinder to exert a braking force on the wheel in response to the pressure of the fluid in said wheel cylinder;
   a control cylinder positioned coaxial with said brake piston;
   a piezoelectric piston device, which is provided in said control cylinder and includes a plurality of laminated thin-plate piezoelectric elements, and which is expanded and contracted by the supply of voltage;
   a hydraulic chamber, which is formed in said control cylinder by partitioning said control cylinder with said piezoelectric piston device, and the pressure which corresponds to the expansion and contraction of said piezoelectric piston device;

a displacement amplifying mechanism, which amplifies the expansion and contraction of said piezoelectric piston device in response to changes in the fluid pressure in said hydraulic chamber generated by the expansion and contraction of said piezoelectric piston device; and a displacement member, which is driven by said displacement amplifying mechanism in response to changes in pressure in said hydraulic chamber to vary the braking force of said brake piston by the amount of movement of said displacement member.

2. An apparatus according to claim 1, wherein said displacement amplifying mechanism is inserted into a cylinder formed by a wall which partitions said hydraulic chamber and is positioned such that it can protrude into said hydraulic chamber, said mechanism including small piston means which have a working surface area smaller than that of said piezoelectric piston device and which are coupled with said displacement member.

3. An apparatus according to claim 2, wherein a plurality of holes are provided as cylinders into which said small piston means are inserted.

4. An apparatus according to claim 1, wherein fluid is supplied to said wheel cylinder from a master cylinder in response to the operation of a brake pedal.

5. An apparatus according to claim 4, further comprising a control valve which is located in a passage for supplying fluid to said wheel cylinder from said master cylinder, for opening and closing said passage.

6. An apparatus according to claim 1, further comprising fluid supply means for supplying fluid to said wheel cylinder, and a control valve located in a passage between said fluid supply means and said wheel cylinder, for opening and closing said passage.

7. An apparatus according to either claim 5, wherein said control valve includes a cylinder formed in said brake caliper, a driving piston, which comprises a plurality of laminated thin-plate piezoelectric elements arranged to form an operating chamber for the fluid pressure in said cylinder, and a valve plunger, which is driven by the pressure in said operating chamber to open and close said fluid passage, said valve plunger being inserted into said operating chamber through cylinder holes which have a working surface area that is smaller than that of said driving piston.

8. An apparatus according to claim 1, wherein said brake piston comprises cylinder means, which is movably provided in said wheel cylinder and which is partitioned into first and second control cylinders by a wall, said piezoelectric piston device is provided such that said hydraulic cylinder is formed between said wall and said first control cylinder, said displacement member is provided inside said second control cylinder facing the inside of said wheel cylinder, small piston means having a working surface area that is smaller than that of said piezoelectric piston device are provided on said displacement member, said small piston means being inserted into said hydraulic chamber through cylinder holes formed in said partitioning wall.

9. An apparatus according to claim 1, further comprising a guide cylinder which is coaxial with said wheel cylinder and partitioned from said wheel cylinder by a wall, a housing which moves inside and coaxially to said guide cylinder in which said control cylinder is formed coaxial to said wheel cylinder, and coupling means for selectively holding said housing within said guide cylinder.

10. An apparatus according to claim 9, wherein said coupling means is constructed by housing a piezoelectric device, which comprises a plurality of laminated plate-shaped piezoelectric elements, inside a chamber in said housing opening to and facing the inside wall of said guide cylinder, voltage being applied to said plurality of piezoelectric elements to expand them to thereby couple said housing with the inside wall of said guide cylinder.

11. An apparatus according to claim 9, wherein piezoelectric piston device is provided in said control cylinder in said housing such that a hydraulic chamber is formed in the opposite side to said wheel cylinder, said displacement member is moved along the axis of said guide cylinder by said displacement amplifying means, which is attached to a lid plate facing the working surface of said piezoelectric piston device dividing said hydraulic chamber, in response to the expansion and contraction of said piezoelectric piston device, and said displacement member is coupled to said brake piston by way of a shaft which passes through said wall between said housing and said wheel cylinder.

12. An apparatus according to claim 11, further comprising first and second coupling members for selectively coupling said guide cylinder with said housing and displacement member such that said shaft is selectively coupled with said housing and displacement member, and third and fourth coupling members for selectively coupling said shaft with said housing and displacement member.

13. An apparatus according to claim 12, wherein said first and fourth coupling members and said second and third coupling members are driven in pairs, and said housing and displacement member are coupled to the inside wall of said guide cylinder or said shaft.

14. A vehicle braking control apparatus, comprising:
fluid pressure generation means for generating fluid pressure corresponding to a vehicle braking operation;

a braking mechanism provided for each wheel of the vehicle and to which is supplied fluid pressure from said fluid pressure generation means for applying a braking force to each wheel corresponding to this fluid pressure, said braking mechanism comprising a wheel cylinder which has a hydraulic chamber and supplies fluid pressure from said fluid pressure generation means, a brake piston provided inside said wheel cylinder for applying a braking force on the wheel by fluid pressure in said hydraulic chamber and a control valve provided in a passage for supplying fluid pressure to said wheel cylinder from said fluid pressure generation means to open and close this passage;

a piezoelectric piston device constructed of a plurality of laminated piezoelectric elements for expanding and contracting to vary the volume of a hydraulic chamber of said wheel cylinder by the application of a voltage, a displacement amplifying mechanism which is driven by changes in the volume of said hydraulic chamber to amplify expansion and contraction of said piezoelectric piston device, a displacement member which is provided in said wheel cylinder and which is driven in response to the displacement of said displacement amplifying means to vary the volume inside said wheel cylinder, and a control means for applying voltage to said piezoelectric piston device with said fluid passage closed by said control valve and during said displacement member to vary the fluid pressure inside said wheel cylinder.

15. An apparatus according to claim 14, wherein said control means performs antiskid control by supplying fluid pressure from said fluid pressure generation means, causing said control valve to close said fluid passage with the volume of said hydraulic chamber contracted by said piezoelectric piston device, and then supplies a voltage to said piezoelectric piston device to increase the volume of said hydraulic chamber.

16. An apparatus according to claim 14, wherein said control means performs traction control, which generates a braking force, by applying a voltage to said piezoelectric piston device and causing said control valve to close said fluid passage, and then applies a voltage to said piezoelectric piston device to contract the volume of said hydraulic chamber.

17. A vehicle braking control apparatus, comprising:
a wheel cylinder formed in each brake caliper provided for each wheel of the vehicle;
a brake piston provided in said wheel cylinder and driven by the fluid pressure in said wheel cylinder to apply a corresponding braking force to the wheel;
a piezoelectric piston device, which is constructed of a plurality of laminated plate-shaped piezoelectric elements and is combined with said brake piston to vary the volume of said brake piston by expanding and contracting said piezoelectric elements by the application of voltage;
fluid supplying means for supplying fluid to said wheel cylinder;
a control valve formed in said brake caliper near said wheel cylinder for opening and closing a fluid passage connected to said wheel cylinder;
command signal generation means for generating braking command signals based on a signal from a braking signal generation means; and
control means for causing said control valve to close said fluid passage based on a braking command signal from said command signal generation means, expanding and contracting said piezoelectric piston device by varying the voltage applied to the piezoelectric elements that comprise said piezoelectric piston device to vary the volume of said brake piston such that said brake piston moves within said wheel cylinder.

18. An apparatus according to claim 17, further comprising a control cylinder formed in said brake piston, said piezoelectric piston device and a hydraulic chamber in said wheel cylinder the volume of which is varied by the expansion and contraction of said piezoelectric piston device being provided in said control cylinder, driving piston means, which have a working surface area smaller than that of said piezoelectric piston means and are protrudingly provided on a wall, which partitions said hydraulic chamber, and a control piston, which faces the inside of said wheel cylinder so as to vary the volume of said brake piston, and which is coupled to said driving piston device.

19. A vehicle braking control apparatus, comprising:
a wheel cylinder formed in each brake caliper provided for each wheel of the vehicle;
a brake piston movably provided in said wheel cylinder to apply a braking force to the wheel corresponding to the pressure rise inside said wheel cylinder;
a guide cylinder which is provided in said brake caliper coaxial with said wheel cylinder with a wall partitioning off said wheel cylinder and said guide cylinder;
a housing, which is movable along the axis of said wheel cylinder in said guide cylinder and which has a control cylinder formed inside;
a piezoelectric piston device, which comprises a plurality of laminated plate-shaped piezoelectric elements and which forms a hydraulic chamber in said control piston in said housing, for varying the volume of said fluid chamber in said control cylinder by expanding and contracting said piezoelectric elements by the application of voltage;
a displacement member which is driven by changes in volume of the hydraulic chamber in said control cylinder;
a shaft, which passes through said wall partitioning said wheel cylinder and said guide cylinder and couples said displacement member and said brake piston;
coupling means for selectively coupling said housing to said guide cylinder; and
control means for expanding and contracting said piezoelectric piston device by application of voltage with said housing coupled by said coupling means inside said guide cylinder, and driving said displacement member to vary the braking force of said brake piston.

* * * * *